United States Patent
Su et al.

(10) Patent No.: US 6,625,161 B1
(45) Date of Patent: Sep. 23, 2003

(54) ADAPTIVE INVERSE MULTIPLEXING METHOD AND SYSTEM

(75) Inventors: Ching-Fong Su, Santa Clara, CA (US); Yao-Min Chen, San Jose, CA (US); Tomohiko Taniguchi, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/461,165

(22) Filed: Dec. 14, 1999

(51) Int. Cl.[7] .............................................. H04L 12/56
(52) U.S. Cl. ....................................... 370/415; 370/536
(58) Field of Search .................................... 370/412, 415, 370/428, 395.1, 389, 536, 542

(56) References Cited

U.S. PATENT DOCUMENTS

| | | | |
|---|---|---|---|
| 4,740,954 A | 4/1988 | Cotten et al. | 370/60 |
| 5,065,396 A | 11/1991 | Castellano et al. | 370/84 |
| 5,446,738 A | 8/1995 | Kim et al. | 370/94.2 |
| 5,461,622 A | 10/1995 | Bleickardt et al. | 370/84 |
| 5,539,740 A | 7/1996 | Brückner | 370/60.1 |
| 5,561,663 A | 10/1996 | Klausmeier | 370/17 |
| 5,563,885 A | 10/1996 | Witchey | 370/94.2 |
| 5,608,733 A | 3/1997 | Vallée et al. | 370/394 |
| 5,617,417 A | 4/1997 | Sathe et al. | 370/394 |
| 5,619,500 A | 4/1997 | Hiekali | 370/414 |
| 5,712,854 A | 1/1998 | Dieudonne et al. | 370/536 |
| 5,729,544 A | 3/1998 | Lev et al. | 370/352 |
| 5,781,549 A | 7/1998 | Dai | 370/398 |
| 5,835,484 A | 11/1998 | Yamato et al. | 370/230 |
| 5,845,091 A | 12/1998 | Dunne et al. | 395/200.7 |
| 5,875,192 A | 2/1999 | Cam et al. | 370/474 |
| 6,091,709 A * | 7/2000 | Harrison et al. | 370/235 |
| 6,134,246 A * | 10/2000 | Cai et al. | 370/474 |

OTHER PUBLICATIONS

"StrataCom Strategic Wide Area ATM Networks", System Manual, Chapter 1, Cisco WAN Switching System Overview, Cisco Systems, Inc., copyright 1989–1998, 26 pages.

"Multilink Inverse Multiplexer", New Features in Release 12.0(3) T, Cisco Systems, Inc., Posted Jun. 14, 1999, 10 pages.

Zalloua, Tech Tutorials: "ATM Inverse Multiplexing: Time for IMA", http://www.data.com/tutorials/ima.html, 1996, Printed Mar. 13, 1999, 9 pages.

Cholewka, "ATM Inverse Muxing: Budgeted Bandwidth", http://www.data.com/roundups/mux.html, 1997, Printed Mar. 13, 1999, 8 pages.

* cited by examiner

*Primary Examiner*—Kenneth Vanderpuye
(74) *Attorney, Agent, or Firm*—Christie, Parker & Hale, LLP

(57) ABSTRACT

A method and system of combining a plurality of parallel communication channels to emulate a single high-bandwidth communication channel. A continuous stream of packets are grouped as traffic aggregates and assigned to queues associated with the plurality of parallel communication channels. The assignment and reassignment of traffic aggregates to the queues is performed dynamically based on measuring the queue load ratios associated with the lengths of the queues for each of the parallel communication channels. Grouping of existing and future packets as traffic aggregates is based on common attributes shared by the packets such as common source and destination IP addresses.

34 Claims, 5 Drawing Sheets

ADAPTIVE INVERSE MULTIPLEXING METHOD AND SYSTEM

BACKGROUND OF THE INVENTION

The present invention relates generally to network communication systems and methods, and in particular to methods and systems for dynamically balancing a plurality of parallel communication channels with associated queues by grouping and associating packets being transmitted.

A conventional network is made up of a plurality of network components or nodes, such as computing devices, e.g., personal computers, workstations and other similar devices. A limited number of network components and devices on a network spanning a relatively small area is called a local area network (LAN). A collection of LANs connected together is referred to as a wide-area network (WAN). A collection of WANs connected to other LANs and WANs is also referred to as a WAN. The largest WAN is the Internet which is a global network connecting millions of computing devices.

In a Network (LAN, WAN or Internet), most computing devices operate independently of each other, and most computing devices are able to access data or other network components anywhere on the Network. Interconnecting these computing devices and other network components in a Network (LAN, WAN or Internet) are a series of communication links or channels, such as twisted-pair cables, coaxial cables, or fiber optic cables, and network devices, such as routers, switches, and bridges. Each communication channel, however, is subject to limitations, such as limited bandwidth. Bandwidth refers to the amount of data, i.e. network traffic that can be transferred within a particular time period by the particular communication channel. For example, a fiber optic cable conforming to Synchronous Optical Network (SONET) standards with an optical carrier level 1 (OC-1) has a bandwidth of 51.85 Megabits per seconds (Mbps) and an OC-3 fiber optic cable has a bandwidth of 155.52 Mbps.

Conventionally, when additional bandwidth was required, a higher capacity communication channel was installed to replace the lower capacity communication channel. For example, an OC-1 fiber optic cable was replaced by an OC-3 fiber optic cable and thus an additional 100 Mbps of bandwidth was gained. However, completely replacing one communication channel with another communication channel is often costly and time consuming.

Additionally, the number of communication channels and network devices are proportional to the number of computing devices and other network components in a Network. Hence, as the Network grows, i.e. more computing devices and other network components are added, the number of cables and network devices also increases. Therefore, the expense of replacing communication channels often proportionally grows with the expense of adding additional cables and network device.

To reduce these expenses, multiple communication channels in parallel are used to provide the additional bandwidth. By aggregating multiple low-bandwidth parallel communication channels, a single high-bandwidth communication channel can be emulated. For example, three fiber optic cables OC-1 combined has a bandwidth of about 155.55 Mbps which approximately equals a single fiber optic cable OC-3 having a bandwidth of 155.52 Mbps. Likewise, a fraction of a single high-bandwidth communication channel can also be emulated by aggregating a particular number of low-bandwidth parallel communication channels. The aggregation or combining of parallel communication channels requires that a stream of data initially allocated to a single communication channel, be segmented or divided to simultaneously transfer the segmented data stream along one or more parallel communication channels. This technique is often referred to as inverse multiplexing.

However, although the aggregation of parallel communication channels increases bandwidth, the aggregation of parallel communication channels conventionally necessitates that the data stream, specifically data packets, i.e. envelopes containing data, be quickly segmented. Conventionally, this quick division of data packets is achieved with the addition of complex network devices. These complex network devices are required to divide or disassemble the data packets to send out the data simultaneously through multiple communication channels. Furthermore, the complex network devices receiving the disassembled packets must reassemble the data packets in their proper order and format. Therefore, these complex network devices add complexity and cost to the Network, though less than the cost of completely replacing one communication channel with another. Additionally, as the Network changes, e.g., the addition of faster computing devices, or the use of the Network changes, e.g., different segments of the Network transferring tremendous amounts of data at different times, these complex network devices are not adaptable to handle these changes.

SUMMARY OF THE INVENTION

The present invention provides for a system and method of aggregating parallel communication channels to emulate a, or a fraction of, a high bandwidth communication channel.

In one embodiment, a method is provided of aggregating of a plurality of parallel communication channels transmitting packets and each parallel communication channel coupled with an associated queue. The method of aggregating a plurality of parallel communication channels includes the steps of assigning packets to each queue associated with each parallel communication channel, measuring the average queue load ratio of each channel, and re-assigning packets which are assigned to a parallel communication channel with the maximum average queue load ratio to a parallel communication channel with the lowest average queue load ratio.

In another embodiment, an adaptive network system is provided that includes a first network, a plurality of parallel communication channels coupled to the first network, and a second network. The adaptive network system also includes a network switch coupled to the second network and to the plurality of communication channels. The network switch includes a plurality of queues associated with each of the plurality of parallel communication channels. Also, the network switch is configured to measure an average queue load ratio of each of the plurality of queues and to assign packets to each of the plurality of queues based on the average queue load ratios measured.

In another embodiment, an adaptive network device that sends packets through a plurality of parallel communication channels is provided. The adaptive network device includes a plurality of network interface devices coupled to a plurality of communication channels, a memory coupled to the plurality of network interface devices, the memory stores a plurality of queues associated with each of the plurality of communication channels, and a processor coupled to the memory. The processor is configured to measure an average queue load ratio of each of the plurality of communication channels and to assign packets to each queue based on the average queue load ratios measured.

Many of the attendant features of this invention will be more readily appreciated as the same becomes better understood by reference to the following detailed description and considered in connection with the accompanying drawings in which like reference symbols designate like parts throughout.

DETAILED DESCRIPTION OF THE INVENTION

Figure 1:
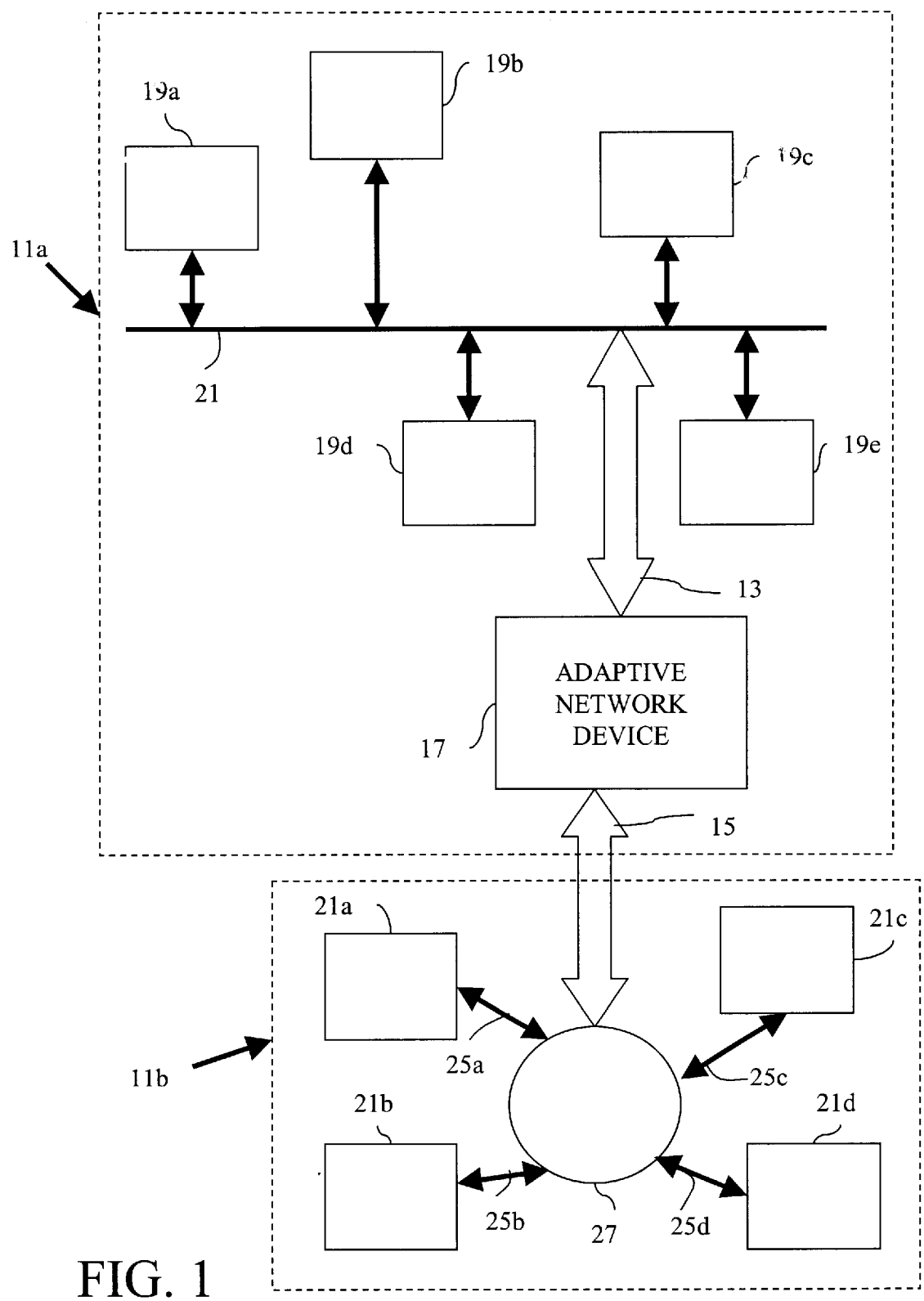
FIG. 1 illustrates a block diagram of an abstract model of one embodiment of an adaptive network system of the present invention.

FIG. 1 illustrates a block diagram of an abstract model of one embodiment of an adaptive network system of the present invention. The abstract model includes a plurality of computing devices interconnected. For illustrative purposes, the number of computing devices and interconnections are limited, as it should be recognized that the number and types of computing devices and their interconnections may be exceedingly numerous. A first network 11A comprises a set or group of computing devices 19a–e interconnected together through first network cables 21. In one embodiment, the first network 11A represents a wide area network. In alternative embodiments, the first network 11A is a local area network or an intranet.

Similarly, a second network 11B comprises a second group of computing devices 21a–d interconnected together through second network cables 25a–d and a second network device 27. As the first network 11A represents a wide area network, the second network 11B, in one embodiment, also represents a wide area network. In alternative embodiments, the second network 11B is a local area network or an intranet. In another embodiment, the first and second network 11A,B are segments or portions of a larger network such as the Internet. Furthermore, the topologies of the first network 11A and the second network 11B are illustrated as a bus topology and a star topology, respectively. However, in other embodiments, other topologies of the first and second networks 11A,B are used.

Connecting the first network 11A to the second network 11B is an adaptive network device 17. In one embodiment, the adaptive network device 11 is included in the first network 11A. The adaptive network device 11 is coupled to the first network through an interconnection cable 13. In one embodiment, the interconnection cable 13 is a single high bandwidth fiber optic cable. In another embodiment, the first network cables 21 is a plurality of communication cables such as a bundle of fiber optic cables or coaxial cables. The adaptive network device 17 is also coupled to the second network 11B through a set of parallel communication channels 15. In alternative embodiments, the adaptive network device 17 is further coupled to additional networks through additional communication channels similar to the set of parallel communication channels 15. In one embodiment, these parallel communication channels are fiber optic cables of OC-3 level.

A continuous stream of data packets are transferred between the first network 11A and the second network 11B through the adaptive network device 17. In one embodiment, headers of the data packets are examined by the adaptive network device to facilitate the forwarding of the data packets to the first or second network 11A,B or to other networks (not shown). The headers of the data packets include destination information such as a destination Internet Protocol (IP) address. In one embodiment, a network device (not shown) within the first network 11A or a second network device in the second network 11B, performs data filtering. Therefore, data only intended for the second network from the first network and vice versa or data intended only for another network through the first or second network is transmitted to the adaptive network device 17.

Figure 2:
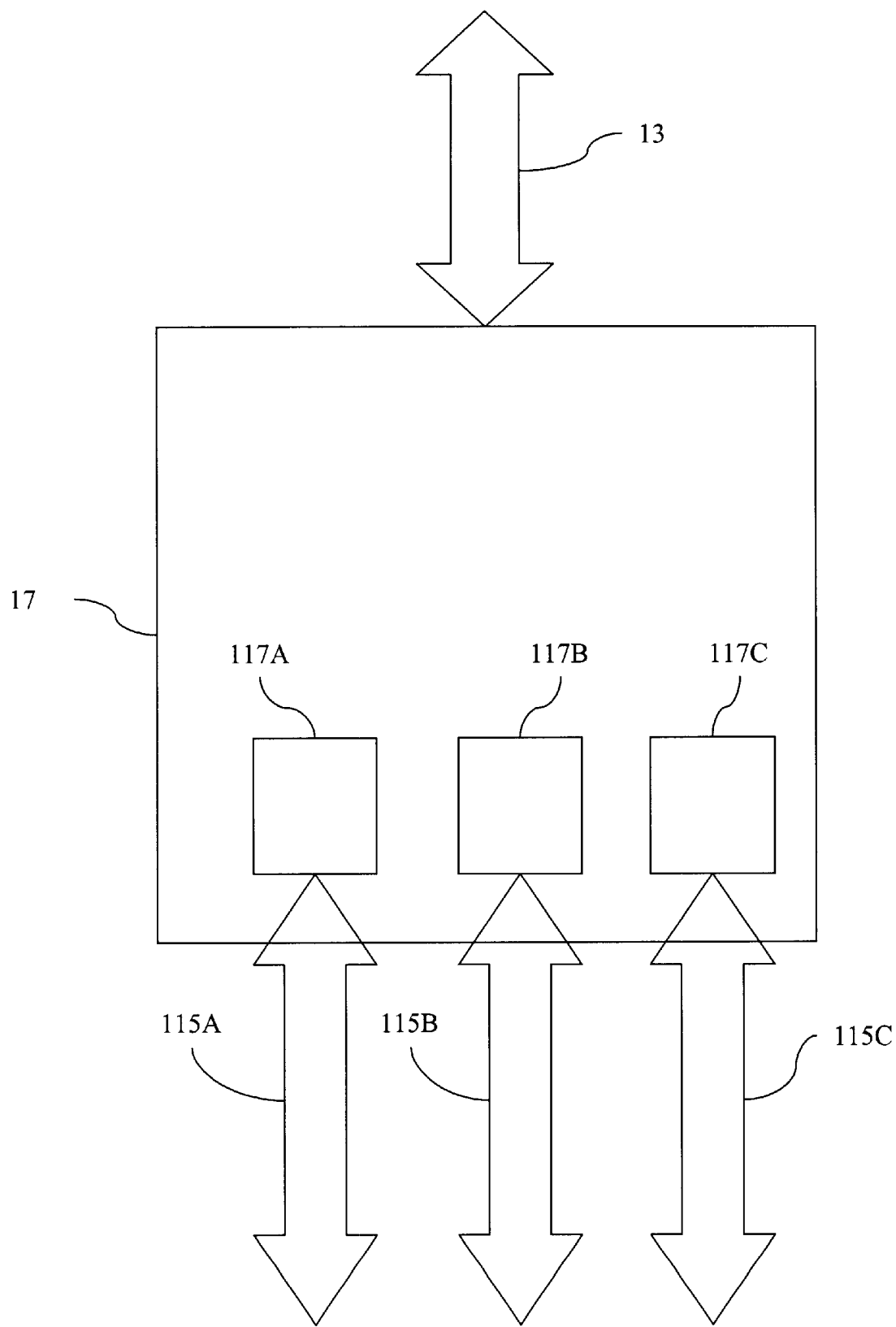
FIG. 2 illustrates a simplified block diagram of one embodiment of an adaptive network device of the present invention.

FIG. 2 illustrates a simplified block diagram of one embodiment of the adaptive network device 11 in FIG. 1. In FIG. 2, the adaptive network device 11 is connected to a first, second and third parallel communication channel 115A–C. The adaptive network device 17 appropriately selects or determines a parallel communication channel by which to send received data packets. In one embodiment, the adaptive network device 17 receives a continuous stream of data packets. As data packets arrive or are received, the adaptive network device groups the data packets into one or more single units or traffic aggregates. Thus, a traffic aggregate refers to an aggregation of continuous traffic flow, i.e., continuous streams of data packets. These traffic aggregates are individually assigned to the parallel communication channels selected by the adaptive network device 17. A first, second and third queue 117A–C are each individually coupled to the first, second and third parallel communication channels, respectively. The traffic aggregates assigned to a specific parallel communication channel are temporarily stored in the queue associated with the given parallel communication channel. When the parallel communication channel becomes available to service the traffic aggregates stored in its respective queue, the packets of the traffic aggregates are transferred from the queue to the respective parallel communication channel. These traffic aggregates are then forwarded to a network that is coupled to the first, second and third parallel communication channels 115A–C.

Figure 3:
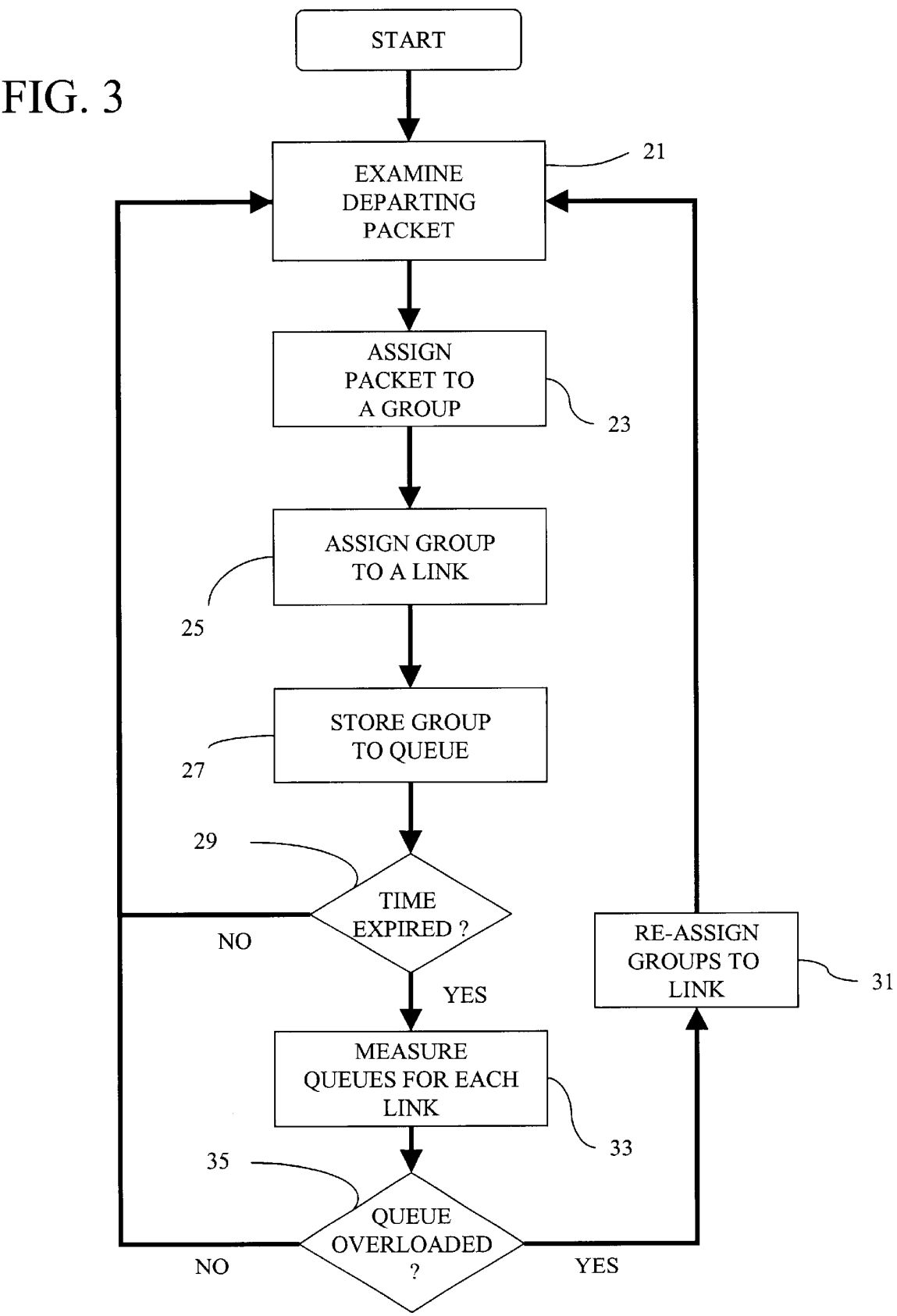
FIG. 3 illustrates a flow diagram of a process of forwarding data packets to the appropriate network which is performed by one embodiment of an adaptive network device.

FIG. 3 illustrates a flow diagram of a process of forwarding data packets to the appropriate network which is performed by one embodiment of an adaptive network device. In step 21, the process examines a continuous stream of packets departing from a network to identify a predetermined common criteria or attribute. In one embodiment, the predetermined common attribute is a destination address contained within the header of a packet. In another embodiment, the predetermined common attribute is source and destination addresses contained within the header of a packet. In step 23, the process groups the continuous stream of packets (existing and future packets) into one or more traffic aggregates based on the identified predetermined common attribute of a packet. For example, existing and future packets containing the destination IP addresses of 193.23.33.6 are grouped into a first traffic aggregate and existing and future packets containing the destination IP addresses of 168.23.45.16 are grouped into a second traffic aggregate.

In step 25, the process further assigns each traffic aggregate to a specific communication channel or link. In one embodiment, the process initially assigns each traffic aggregate to a specific communication channel in a sequential manner. For example, a first traffic aggregate is assigned to a first communication channel and a second traffic aggregate is assigned to a second communication channel. In step 27, the process places the traffic aggregate into a queue associated with the communication channel assigned to the traffic. aggregate. In step 29, the process determines if the measurement time interval T has expired. If the measurement time interval T has expired, then the process in step 33 performs a measurement for each queue associated with each communication channel such that the measurement or measured quantity is the average queue length during the past measurement time interval T. Based on the measurements performed in step 33, the process, in step 35, determines if average queue length measurement for each of the parallel communication channels indicates that resources for the communication channels are not being equally utilized, such that each communication channel has similar packet transfer delay.

If the process in step 35 determines that the average queue length measurement for each of the parallel communication channels indicates that resources for the communication channels are being equally utilized, then the process returns to step 21. Likewise, if the process in step 29 determines that the measurement time interval T has not expired, the process returns to step 21. However, if the process in step 35 determines that the average queue length measurement indicates that resources for the communication channels are not being equally utilized then in step 31, the process reassigns future traffic aggregates to another communication channel. The process then returns to step 21. The process illustrated in FIG. 3 ends when a predetermined condition or action from an external source occurs, such as a shutdown command from a user or the removal of power to the adaptive network device.

Figure 4:
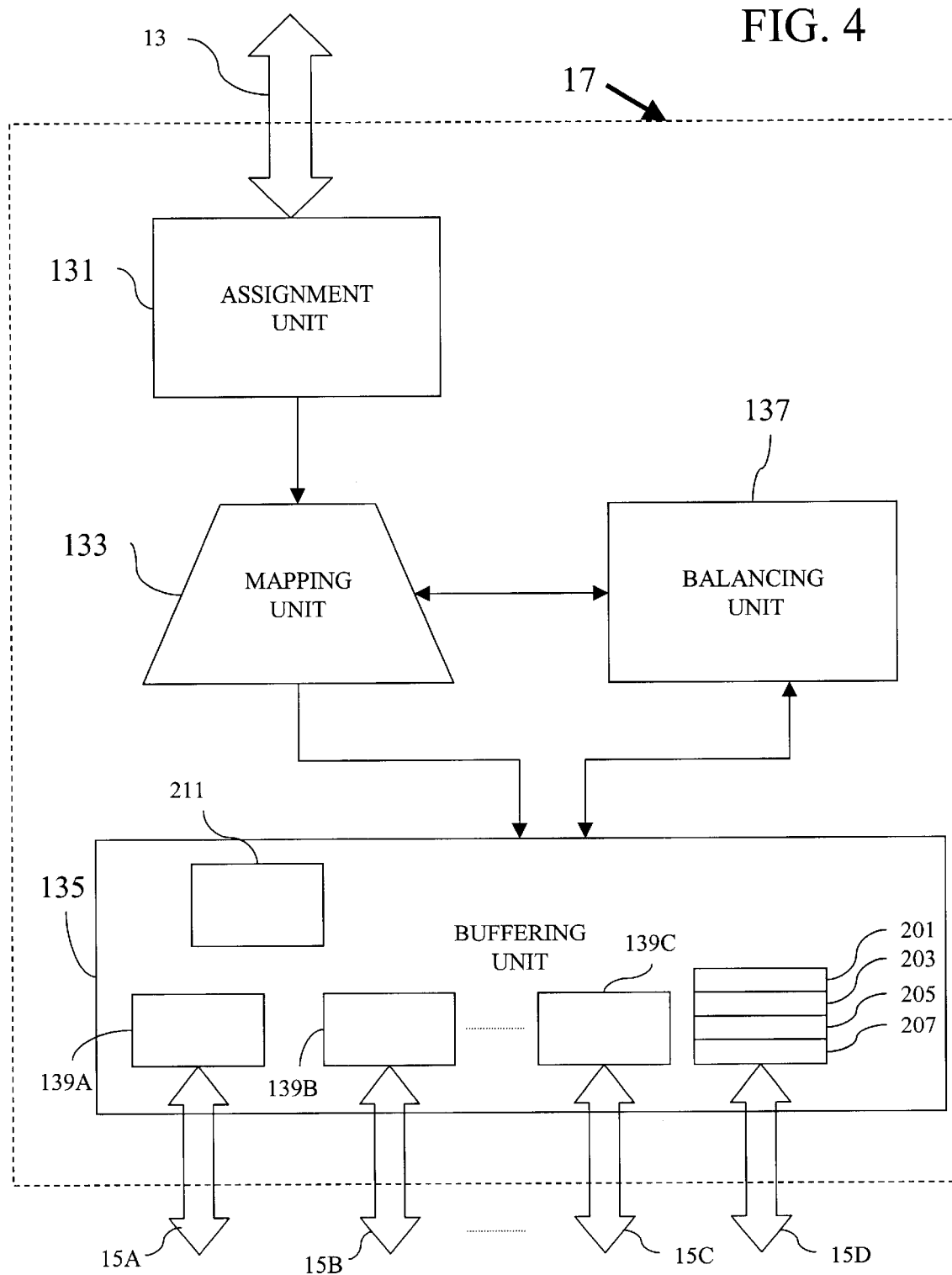
FIG. 4 illustrates a detailed model of one embodiment of the adaptive network device of the present invention.

FIG. 4 illustrates a detailed model of one embodiment of the adaptive network device of the present invention. The adaptive network device 17 illustrated in FIG. 4 is separated into four operational units. These operational units include an assignment unit 131, a mapping unit 133, a buffering unit 135, and a balancing unit 137. The assignment unit 131 receives a continuous stream of packets departing from a specific network. The assignment unit 131 also examines the headers of the received packets to identify the destination addresses of the departing packets. Using the destination addresses, the assignment unit 131 determines a specific key or numerical value to assign to the current set of packets. This unique key, in the embodiment described, is determined using a hash function. The hash function provides a mathematical formula that generates unique numbers for groups of items, i.e., data packets, depending or sharing common attributes or characteristics, i.e., common destination IP addresses. In one embodiment, the function H(p) modulo N is utilized, where H(p) is the hash function applied to a set of packets p and N is the total number of traffic aggregates defined by the adaptive network device. For example, packets containing the destination IP address of 127.188.169.70 produces the hash value of 5 and packets containing the destination IP address of 127.188.169.90 produces a hash value of 7. Therefore, groups of packets (existing and future) based on their destination IP addresses, through the use of the hash function, produce a unique key or hash value and other groups of packets (existing and future) produce a different hash value. The assignment unit 131 calculating the hash values or unique keys provides the calculated keys to the mapping unit 133.

The mapping unit 133, using the unique key or keys, creates or updates a look-up table which maps traffic aggregates to communication channels. Specifically, the look-up table contains entries defining a correspondence between a unique key and a communication channel or link. Table 1 is an example of one such look-up table.

TABLE 1

| Unique Key for Traffic Aggregate | Communication Channel Number |
|---|---|
| 1 | 1 |
| 2 | 2 |
| ... | ... |
| 5 | 3 |
| 7 | 1 |
| 11 | 3 |

The first column of Table 1 represents keys or unique hash values associated with a specific traffic aggregate. The second column indicates the communication channels or links associated with the unique keys. Accordingly, as shown in Table 1, the aggregate having a key of 11 is mapped to link 3, while the aggregate having a key of 7 is mapped to link 1.

The mapping unit 133 updates the look-up table upon each load adjustment interval or measurement time interval T occurring. The measurement time interval T is a predetermined time, such as one second, in which measurements are taken for each queue of each communication channel. The measurement time interval T is set, monitored and maintained by the balancing unit 137. The balancing unit 137 also monitors the buffering unit 135, specifically the queues associated with the parallel communication channels 15A–D.

In one embodiment, a single queue is associated with each parallel communication channel coupled to the adaptive network device. In another embodiment, multiple queues are associated with each parallel communication channel coupled to the adaptive network device. In another embodiment, multiple queues are associated with some of the parallel communication channels and single queues are associated with the remaining parallel communication channels. In FIG. 4, queues 139A–C are associated, respectively, with parallel communication channels 15A–C. Also, a first, second, third and fourth queue 201, 203, 205 and 207 are associated with the communication channel 15D.

A queue scheduler 211 included in the buffering unit 135 determines the service order of the first, second, third and fourth queues 201, 203, 205 and 207. The service order determines the sequence in which a communication channel would retrieve a packet from a queue. In one embodiment, the queue scheduler sets a priority to each queue to define the service order. The queue with the highest priority is the queue from which the communication channel would retrieve a packet from first. In another embodiment, the queue scheduler sets the service order in a sequential fashion. For example, the queue scheduler would retrieve the packets from a queue until it is empty and then retrieve packets from the next queue and so on. In one embodiment, the queue scheduler 211 can set an absolute priority to queue 201. Thus, a packet from queue 203 would not be retrieved unless queue 201 is empty. Furthermore, the queue scheduler by defining a service order and the buffering unit by placing important packets in the highest priority queue, a service differentiation and quality guarantee is provided. In other words, certain packets and thus applications can be given a higher priority or placement in the service order then other packets. Therefore, certain packets with a high priority are given improved service or quality guarantee than other packets that have a lower placement in the service order.

In the embodiment described above, the mapping unit 133 also provides a queue mapping table. Table 2 is an example of a queue mapping table.

TABLE 2

| Queue Number | Communication Channel Number |
|---|---|
| 1 | 1 |
| 2 | 2 |
| ... | ... |
| 7 | 3 |
| 3 | 1 |
| 6 | 3 |
| 5 | 3 |
| 8 | 4 |
| 9 | 4 |

The queue mapping table associates queues with links. The first column of Table 2 contains unique queue numbers representing queues associated with respective communication channels or links. The second column contains unique link numbers representing links associated with the unique queue numbers. For example, queues 5, 6, and 7 are assigned to link 3 and queues 8 and 9 are assigned to link 4.

Using the queue mapping table, in one embodiment, the mapping unit 133 and the balancing unit 137 assigns and reassigns queues. For example, if link 3 becomes overloaded, then queue 6 and/or 7 is re-assigned to link 4. Hence, when queue 6 is reassigned due to the overload on link 3, the traffic aggregates are also moved from link 3 to link 4. If a single queue is assigned to a link, then, in one embodiment, a new queue is dynamically created as needed by the buffering unit 133. For example, queue 1 is assigned to link 1 and queue 2 is assigned to link 2. If link 1 becomes overloaded, then queue 1 is re-assigned to link 2. Additionally, queue 2 could be re-assigned to link 1. Alternatively, a new queue is dynamically created by the buffering unit 135 and assigned to link 1.

Also, the look-up table described in Table 1 would be modified to map the traffic aggregates with the queues instead of the links. Table 3 is an example of a modified look-up table.

TABLE 3

| Unique Key for Traffic Aggregate | Queue Number |
|---|---|
| 1 | 1 |
| 2 | 2 |
| ... | ... |
| 5 | 7 |
| 7 | 3 |
| 11 | 7 |

In one embodiment, the mapping between traffic aggregate and queues are fixed, i.e. the traffic aggregates cannot be reassigned to other queues by the balancing unit 137. Therefore, if a link is overloaded, one queue and also the existing packets inside the queue are moved to other links. Hence, when the queues are re-assigned or moved, existing packets and implicitly future packets are also moved. As a result, the transferring of packets from the same application being sent on different links at the same time is prevented. Therefore, these packets will not be re-ordered.

Each queue acts as a buffer holding packets belonging to the traffic aggregates that are waiting to be sent along the associated communication channel. During the measurement time interval T, these queues for each of the communication channels are measured by the balancing unit 137. Specifically, the average queue length on each communication channel is measured. The average queue length for a communication channel during measurement time interval T is determined using equations 1a–c.

$$Q_x \leftarrow Q_x + q_p * L_p \quad \text{(Equation 1a)}$$

$$\text{avg}(q_x) \leftarrow Q_x / c_x T \quad \text{(Equation 1b)}$$

$$Q_x \leftarrow 0 \quad \text{(Equation 1c)}$$

In equations 1a–c, $L_p$ is the size of a packet p, $q_p$ is the instantaneous queue length when packet p departs, $c_x$ is the capacity (maximum number of bits transmitted per second) of the measured communication channel and $Q_x$ is a temporary queue summation variable. Mathematically,, the average queue length $\text{avg}(q_x)$, during a measurement time interval T, is determined by computing the integral of the function of a queue length for a communication channel over the measurement time interval T and dividing the integral by the measurement time interval T at the end of the measurement time interval T. Equations 1a–c reflect this mathematical computation.

Since the queue length remains at a fixed level or length when a packet departs, the queue length for a communication channel when a packet departs is equal to the instantaneous queue length $q_p$ for the last $(L_p/c_x)$ seconds. Thus, the integral can be computed as the summation of the instantaneous queue length $q_p$ times the product of the size of the departing packet $L_p$ divided by the capacity of the measured communication channel $c_x$ (i.e., $q_p * (L_p/c_x)$) for all the packets that have departed during the measurement time interval T. However, to avoid making a division computation at upon each packet departing, which can be costly, the division by the capacity of the measure communication channel $c_x$ with the measurement time interval T is performed at the end of the measurement time interval T.

Therefore, referring back to Equations 1a–c and FIG. 4, at the start of the measurement time interval T, the temporary queue summation variable $Q_x$ associated with the communication channel X is zero. During the measurement time interval T for each packet departing from the communication channel X, the balancing unit 137 continually calculates the temporary queue summation variable $Q_x$ (Equation 1a). In other words, Equation 1a is computed each time a packet departs. At the end of the measurement time interval T, the temporary queue summation variable $Q_x$ is summation of the instantaneous queue length $q_p$ times the product of the size of the departing packets $L_p$ from communication channel X. Also, at the end of the measurement time interval T, the average queue length $\text{avg}(q_x)$ for the communication channel is computed by dividing the capacity of the measured communication channel $c_x$ and the measurement time interval T (Equation 1b). Once the average queue length $\text{avg}(q_x)$ has been calculated, the temporary queue summation variable $Q_x$ is zeroed (Equation 1c) in preparation for the starting of the next measurement time interval T and thus the next calculation of the temporary queue summation variable $Q_x$.

Once the average queue length has been measured for each of the queues associated with the parallel communication channels, the balancing unit 137 determines the minimum average queue length and the maximum average queue length for each of the queues. By dividing the average queue length by the capacity for the measured communication channel, the average queue load ratio is determined. Therefore, the balancing unit 137 also determines the minimum average queue load ratio $QR_{min}$ and the maximum average queue load ratio $QR_{max}$ for the respective minimum and maximum average queues of the respective parallel communication channels.

Furthermore, the balancing unit 137 also determines if any of the queues and thus the parallel communication channels are being overloaded, i.e., if the measurement of queue load ratios indicates that the resources for the communication channels or queues are not being equally utilized. In one embodiment, the balancing unit 137 makes this determination by comparing the minimum average queue load ratio $QR_{min}$ to the maximum average queue load ratio $QR_{max}$ as illustrated by Equation 2.

$$QR_{max} > (QR_{min}) \quad \text{(Equation 2)}$$

In equation 2, the maximum average queue load ratio $QR_{max}$ equals $q_{max}/c_{max}$ and minimum average queue load ratio $QR_{min}$ equals $q_{min}/c_{min}$, where $q_{max}$ and $q_{min}$ are the maximum and minimum average queue length, respectively, and $c_{max}$ and $c_{min}$ are the capacity of the communication channels associated with the respective maximum and minimum average queue lengths. The coefficient represents a modifier for the predetermined threshold value in terms of the minimal average queue load ratio $QR_{min}$.

If the communication channel is determined to be overloaded by the balancing unit 137, the balancing unit 137 notifies the mapping unit 133 to reassign the traffic aggregates, i.e., the oldest traffic aggregates. The oldest traffic aggregates are the traffic aggregates that were last assigned to the communication channel having the maximum average queue load ratio. Likewise, future packets of the oldest traffic aggregate are also forwarded to the communication channel having the minimal queue load ratio instead of the communication channel having the queue with the maximum queue load ratio.

With the mapping unit 133 assigning and reassigning traffic aggregates as individual whole units to communication channels, the chance of out of order packet delivery of the packets is reduced. However, during the re-mapping or reassigning of the traffic aggregates to different communication channels, out of order packet delivery is possible. Out of order packet delivery often causes a receiving network device to be overwhelmed, as more processing power is required to rearrange or reassemble the packet order of a given data transmission. By adjusting the coefficient in equation 2, the balancing unit 137 is capable of being dynamically configured to minimize out of order packet delivery. Increasing the value of the coefficient in equation 2 would reduce the reassigning of traffic aggregates which could cause out of order packet delivery, since the frequency of equation 2 being true would also be reduced. In other words, the balancing unit 137 would determine, with less frequency, that a queue and thus a parallel communication channel is being overloaded, since the predetermined threshold value of $(QR_{min})$ would often be larger than the maximum average queue load ratio $QR_{max}$.

Also, the balancing unit 137 through the use of the product of N times T, in which N is the number of traffic aggregates and T is the measurement time interval, the balancing unit 137 is further able to dynamically minimize out of order packet delivery. The product of N times T represents the frequency in which a single traffic aggregate out of N traffic aggregates for every measurement time interval T is reassigned. Since out of order packet delivery may occur on the reassigning of a traffic aggregate from one communication channel to another communication channel, the larger the product of N times T is the smaller the chance of out of order packet delivery. Conversely, the smaller the product of N times T is, the more likely out of order packet delivery may occur. However, the smaller the product of N times T is, the more often traffic aggregates are reassigned. Therefore, greater control or balancing of the number of traffic aggregates assigned to each communication channel is possible as well as greater balancing of the loads or lengths of the queues associated with the communication channels.

Referring back to FIG. 3 in conjunction with FIG. 4, the operational units, illustrated in FIG. 4, in one embodiment, is configured to perform the process illustrated in FIG. 3. The steps 21 and 23, in FIG. 3, are performed by the assigning unit 131. Step 25 is performed by the mapping unit 133 and step 27 by the buffering unit 135. Steps 29, 31, 33, 35 are performed by the balancing unit 137. Similarly, the operations performed by the units illustrated in FIG. 4, in another embodiment, is incorporated into the process illustrated in FIG. 3.

Figure 5:
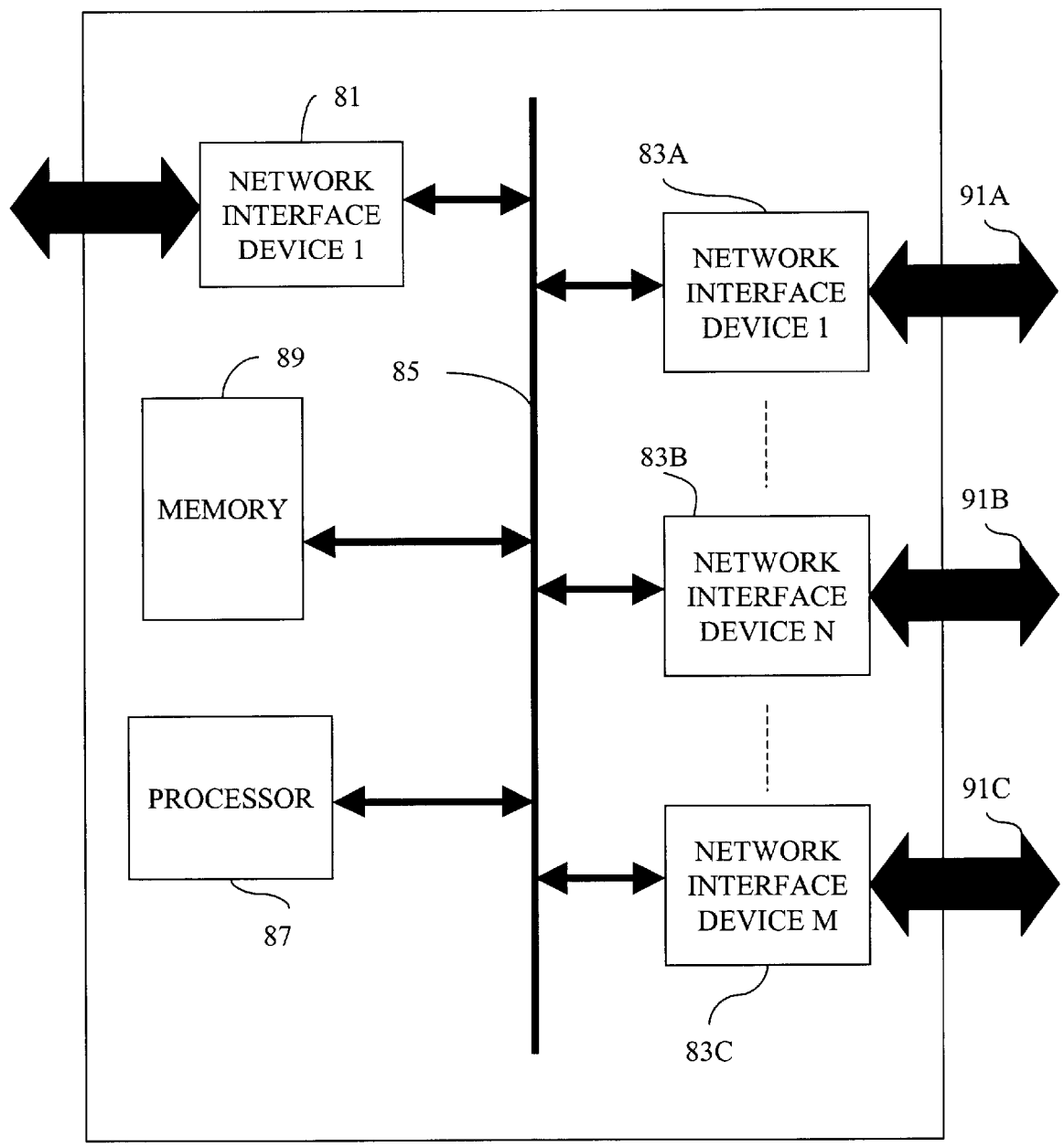
FIG. 5 illustrates a block diagram of one embodiment of the adaptive network device of the present invention.

FIG. 5 illustrates a block diagram of one embodiment of the adaptive network device of the present invention. In one embodiment, the adaptive network device is a stand-alone network device or a computing device, e.g., a personal computer programmed with firmware or software. The adaptive network device receives and transmits data through network interface devices 81 and 83A–C. The data received by the network interface device 81 is from various computing devices intended for other computing devices coupled to the network interface devices 83A–83C. A continuous stream of data packets are continuously received by the network interface 81 and transferred along a bus 85. The processor 87 coupled to the bus 85 examines the transferred data to determine where to store the data in a particular queue. Queues for the associated communication channels 91A–C are stored in a memory 89. The queues are of varying size and structure. In the embodiment described, the queues are First In, First Out (FIFO) data structures stored in the memory 89.

The memory 89 also stores a lookup table in which groups of packets are assigned to communication channels 91A–C. As the queues within the memory 89 are being filled by the processor 87, the network devices 83A–C associated with the queues in the memory 89 removes the data from the appropriate queues. The network interface devices 83A–83C removes data from the queues based on the availability of their respective communication channels 91A–C. The communication channels 91A–C represent parallel low bandwidth communication channels, such as a fiber optic cable of OC-1 level. Therefore, as data is transferred in through network interface device 81, data is quickly being transferred out through parallel communication channels 91A–C.

Furthermore, the processor is configured to maintain and balance the queues of the parallel communication channels. The processor changes entries, i.e., re-maps entries in the lookup table, to maintain the balance of queues to prevent any one queue and thus any one communication channel from becoming overloaded. Measurements are taken and analyzed by the processor to continue to maintain this balance.

Accordingly, the present invention provides an adaptive network device and method for a network using an adaptive network device. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

What is claimed is:

1. A method of aggregating a plurality of parallel communication channels transmitting packets and each parallel communication channel coupled with an associated queue, the method comprising:
   assigning packets to each queue associated with each of a plurality of parallel communication channels;
   computing average queue load ratios for each of the plurality of parallel communication channels; and
   re-assigning packets which are assigned to a first one of the plurality of parallel communication channels with a maximum average queue load ratio to a second one of the plurality of parallel communication channels with a lowest average queue load ratio.

2. The method of claim 1 wherein assigning packets comprises:
   determining a plurality of traffic aggregates; and
   assigning each of the plurality of traffic aggregates to each of the plurality of parallel communication channels based on a predetermined map.

3. The method of claim 2 wherein the predetermined map is determined from a look-up table presenting each the plurality of traffic aggregates to each of the plurality of parallel communication channels.

4. The method of claim 3 wherein each of the pluarlity of traffic aggregates is a set of packets having in common at least one pre-determined attribute.

5. The method of claim 4 wherein the at least one pre-determined attribute is a common key determined based on the destination of a packet.

6. The method of claim 5 wherein the common key is a hash value, the hash value being a unique number calculated using a hash function that depends on a destination Internet protocol address of a packet.

7. The method of claim 1 wherein assigning packets comprises:
   determining a plurality of traffic aggregates; and
   assigning each of the plurality of traffic aggregates to each of the plurality of parallel communication channels randomly.

8. The method of claim 7 wherein each of the plurality of traffic aggregates is a set of packets having in common at least one pre-determined attribute.

9. The method of claim 8 wherein the at least one pre-determined attribute is a common key determined based on a destination of a packet.

10. The method of claim 9 wherein the common key is a hash value, the hash value being a unique number calculated using a hash function that depends on a destination Internet protocol address of a packet.

11. The method of claim 1 wherein computing the average queue load ratio for each of the plurality of communication channels comprises:
    measuring an average queue length for each of the parallel communication channels, a queue length being the total bytes contained in packets assigned to a queue;
    determining capacity of each of the plurality of the parallel communication channels; and
    dividing each of the average queue lengths measured by each of the capacities determined for each of the plurality of parallel communication channels.

12. The method of claim 11 wherein measuring the average queue length of each of the parallel communication channels comprises:
    measuring the size of a departing packet, the departing packet being a packet leaving a queue;
    determining the length of the queue when the departing packet leaves the queue; and
    determining the capacity of one of the plurality of parallel communication channels associated with the queue.

13. The method of claim 12 wherein measuring the average queue length of each of the parallel communication channels further comprises:
    summing the product of the size of the departing packet measured by the length of the queue determined when the departing packet leaves the queue for all packets that leave the queue during a pre-determined measurement time interval; and
    dividing the summation of the products by the capacity determined of one of the plurality of parallel communication channels associated with the queue and the pre-determined measurement time interval.

14. The method of claim 12 wherein the pre-determined time interval is about a half of a second to one and one half second.

15. The method of claim 1 further comprising continuing to re-assign packets per a pre-determined time interval.

16. The method of claim 12 wherein the pre-determined time interval is one second.

17. An adaptive network system comprising:
    a first network;
    a plurality of parallel communication channels coupled to the first network;
    a second network; and
    a network switch coupled to the second network and to the plurality of communication channels, the network switch includes a plurality of queues associated with each of the plurality of parallel communication channels and the network switch is configured to measure an average queue load ratio of each of the plurality of queues and to assign and re-assign packets to each of the plurality of queues based on a maximum, minimum or both maximum and minimum average queue load ratios measured.

18. The adaptive network system of claim 17 wherein the network switch further comprises:
    memory containing the plurality of queues; and
    processor configured to assign and re-assign packets to each queue and to measure the average queue load ratio of each of the plurality of parallel communication channels.

19. An adaptive network device sending packets through a plurality of parallel communication channels comprising:
    a plurality of network interface devices coupled to a plurality of parallel communication channels;
    a memory coupled to the plurality of network interface devices, the memory stores a plurality of queues associated with each of the plurality of communication channels; and
    a processor coupled to the memory, the processor configured to measure an average queue load ratio of each of the plurality of communication channels and to assign and re-assign packets to each of the plurality of queues based on a maximum, minimum or both maximum and minimum average queue load ratios measured.

20. The adaptive network device of claim 19 wherein the processor is further configured to determine capacities of each of the plurality of communication channels and is configured to assign and re-assign packets by grouping the packets into traffic aggregates and assigning the traffic aggregates to each of the plurality of communication channels based on the maximum, minimum or both maximum and minimum average queue load ratios measured.

21. The adaptive network device of claim 20 wherein each of the traffic aggregates is a set of packets having in common at least one pre-determined attribute.

22. The adaptive network device of claim 21 wherein the at least one pre-determined attribute is a common key determined based on a destination of a packet.

23. The adaptive network device of claim 22 wherein the common key is a hash value, the hash value being a unique number calculated using a hash function that depends on a destination Internet protocol address of a packet.

24. The adaptive network device of claim 23 wherein the processor is configured to measure the average queue load ratio of each of the plurality of communication channels by measuring the average queue length of each of the plurality of communication channels, such that a queue length is a total number of bytes in packets assigned to each of the plurality of queues associated with each of the plurality of communication channels, by determining the capacity of each of the plurality of communication channels of the associated queue, and by dividing the determined average queue lengths by the determined capacity of each of the plurality of communication channels.

25. The adaptive network device of claim 24 wherein the processor is further configured to continue to measure the average queue load ratio of each of the plurality of communication channels for a plurality of predetermined time intervals and the processor re-assigns packets to each queue based on the maximum, minimum or both maximum and minimum average queue load ratios measured for each of the plurality of predetermined time intervals.

26. The adaptive network device of claim 25 wherein each of the plurality of predetermined time intervals is one second in length.

27. An adaptive network device sending packets through a plurality of parallel communication channels comprising:
   a plurality of network interface devices coupled to a plurality of communication channels;
   a memory coupled to the plurality of network interface devices, the memory stores a plurality of queues associated with each of the plurality of communication channels; and
   a processor coupled to the memory, the processor configured to measure an average queue load ratio of each of the plurality of communication channels and to assign a set of the plurality of queues to each of the plurality of communication channels based on a maximum, minimum or both maximum and minimum average queue load ratios measured.

28. The adaptive network device of claim 27 wherein the processor is further configured to assign the packets by grouping the packets into traffic aggregates and assigning the traffic aggregates to each of the plurality of communication channels based on the maximum, minimum or both maximum and minimum average queue load ratio measured of each of the plurality of communication channels.

29. The adaptive network device of claim 28 wherein each of the traffic aggregates is a set of packets having in common at least one pre-determined attribute.

30. The adaptive network device of claim 29 wherein the at least one pre-determined attribute is a common key determined based on a destination of a packet.

31. The adaptive network device of claim 30 wherein the common key is a hash value, the hash value being a unique number calculated using a hash function that depends on a destination Internet protocol address of a packet.

32. The adaptive network device of claim 31 further comprising a queue scheduler coupled to the memory and the plurality of network devices, the queue scheduler determines a service order in which a packet is extracted from the set of the plurality of queues.

33. The adaptive network device of claim 32 wherein the processor is further configured to continue to measure the average queue load ratio of each of the plurality of communication channels for a plurality of predetermined time intervals and re-assigns the set of the plurality of queues to each of the plurality of communication channels based on the maximum, minimum or both maximum and minimum average queue load ratios measured for each of the plurality of predetermined time intervals.

34. The adaptive network device of claim 33 wherein each of the plurality of predetermined time intervals is at least a half a second in length.

* * * * *